(12) United States Patent
Goto et al.

(10) Patent No.: US 10,615,430 B2
(45) Date of Patent: Apr. 7, 2020

(54) JOINT SEPARATOR FOR FUEL CELL, AND FUEL CELL STACK

(71) Applicant: HONDA MOTOR CO., LTD., Minato-ku, Tokyo (JP)

(72) Inventors: Shuhei Goto, Wako (JP); Hiroshi Morikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/154,816

(22) Filed: Oct. 9, 2018

(65) Prior Publication Data

US 2019/0109335 A1 Apr. 11, 2019

(30) Foreign Application Priority Data

Oct. 11, 2017 (JP) .................. 2017-197675

(51) Int. Cl.
| | | |
|---|---|---|
| *H01M 8/0206* | (2016.01) | |
| *H01M 8/0228* | (2016.01) | |
| *H01M 8/0254* | (2016.01) | |
| *H01M 8/0263* | (2016.01) | |
| *H01M 8/0267* | (2016.01) | |
| *H01M 8/2457* | (2016.01) | |
| *H01M 8/2483* | (2016.01) | |
| *H01M 8/242* | (2016.01) | |
| *H01M 8/0297* | (2016.01) | |

(52) U.S. Cl.
CPC ....... *H01M 8/0267* (2013.01); *H01M 8/0206* (2013.01); *H01M 8/0228* (2013.01); *H01M 8/0254* (2013.01); *H01M 8/0263* (2013.01); *H01M 8/0297* (2013.01); *H01M 8/242* (2013.01); *H01M 8/2457* (2016.02); *H01M 8/2483* (2016.02)

(58) Field of Classification Search
CPC ............. H01M 8/0206; H01M 8/0228; H01M 8/0254; H01M 8/0263; H01M 8/0267; H01M 8/0297; H01M 8/242; H01M 8/2457; H01M 8/2483
See application file for complete search history.

(56) References Cited

U.S. PATENT DOCUMENTS

| | | | |
|---|---|---|---|
| 5,346,661 A | 9/1994 | Dunyak et al. | |
| 9,660,276 B2 | 5/2017 | Sugiura et al. | |
| 2005/0214620 A1* | 9/2005 | Cho .................... | H01M 8/0276 429/483 |
| 2006/0054664 A1 | 3/2006 | Strobel et al. | |
| 2017/0222247 A1* | 8/2017 | Sakano ............... | H01M 8/2457 |
| 2018/0287170 A1* | 10/2018 | Oku ........................ | H01M 8/24 |

FOREIGN PATENT DOCUMENTS

| | | |
|---|---|---|
| JP | 2007-026737 A | 2/2007 |
| WO | 2012/053288 A1 | 4/2012 |
| WO | WO 2017/060972 * | 4/2017 |

* cited by examiner

*Primary Examiner* — Anca Eoff
(74) *Attorney, Agent, or Firm* — Carrier Blackman & Associates, P.C.; Joseph P. Carrier; William D. Blackman (57) ABSTRACT

A joint line includes a passage joint line, a first outer joint line provided in outer peripheral portions of a first metal separator and a second metal separator, and a second outer joint line provided in the outer peripheral portions of the first metal separator and the second metal separator around the first outer joint line.

9 Claims, 4 Drawing Sheets

JOINT SEPARATOR FOR FUEL CELL, AND FUEL CELL STACK

CROSS-REFERENCE TO RELATED APPLICATION

This application is based upon and claims the benefit of priority from Japanese Patent Application No. 2017-197675 filed on Oct. 11, 2017, the contents of which are incorporated herein by reference.

BACKGROUND OF THE INVENTION

Field of the Invention

The present invention relates to a joint separator for a fuel cell formed by joining two metal separators by a joint line. Further, the present invention relates to a fuel cell stack.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA). The membrane electrode assembly is formed by providing an anode on one surface of the solid polymer electrolyte membrane, and a cathode on the other surface of the solid polymer electrolyte membrane. The membrane electrode assembly is sandwiched between separators (bipolar plates) to form a power generation cell (unit cell). A predetermined number of power generation cells are stacked together to form, e.g. an in-vehicle fuel cell stack mounted in a vehicle.

Outer peripheral ends of the two metal separators that are adjacent to each other are joined together by welding (an outer welding line) to form a joint separator (e.g., see Specification of U.S. Patent Application Publication No. 2006/0054664).

SUMMARY OF THE INVENTION

In the above conventional joint separator, a gap is formed between portions of the second metal separators outside the outer joint line. Therefore, when ions which may cause gap corrosion (hereinafter referred to as the "corrosion causing ions") such as chloride ions enter the gap, gap corrosion (oxygen concentration cell corrosion) may occur in the outer peripheral portions of the metal separators.

The present invention has been made taking such a problem into account, and an object of the present invention is to provide a joint separator for a fuel cell and a fuel cell stack which make it possible to suppress gap corrosion in outer peripheral portions of metal separators, and improve durability of the metal separators.

In order to achieve the above object, a joint separator for a fuel cell according to the present invention includes two metal separators stacked together, and joined by a joint line. Each of the metal separators includes a reactant gas flow field for allowing a reactant gas to flow along an electrode surface, and a reactant gas passage connected to the reactant gas flow field. A coolant flow field is formed between the metal separators stacked together for allowing a coolant to flow between the metal separators. The joint line includes a passage joint line provided around the reactant gas passage, a first outer joint line provided in an outer peripheral portion of the metal separator, and surrounding the reactant gas flow field, the coolant flow field, and the reactant gas passage entirely, and a second outer joint line provided in the outer peripheral portion of the metal separator, around the first outer joint line.

In the joint separator for the fuel cell, preferably, the two metal separators may be in contact with each other between the first outer joint line and the second outer joint line.

In the joint separator for the fuel cell, preferably, contact surfaces of the two metal separators between the first outer joint line and the second outer joint line may be flat surfaces.

In the joint separator for the fuel cell, preferably, the second outer joint line may be provided along the outer shape of the metal separator.

In the joint separator for the fuel cell, preferably, the joint line may be a laser welding bead.

In the joint separator for the fuel cell, preferably, the two metal separators may be in contact with each other outside the second outer joint line.

In the joint separator for the fuel cell, preferably, the contact surfaces of the two metal separators outside the second outer joint line may be flat surfaces.

In the joint separator for the fuel cell, preferably, each of the two metal separators may include a bead seal configured to prevent fluid leakage, around the coolant flow field and the reactant gas passage, and protruding from a surface of the metal separator, and the first outer joint line is provided outside and adjacent to the bead seal.

In the fuel cell stack according to the present invention, the fuel cell stack includes stacked power generation cells. Each of the power generation cells includes a membrane electrode assembly and metal separators provided on both sides of the membrane electrode assembly. The membrane electrode assembly includes an electrolyte membrane and electrodes provided on both sides of the electrolyte membrane. Two of the metal separators that are adjacent to each other are joined together to form the above described joint separator for the fuel cell.

In the present invention, the second outer joint line is provided in the outer peripheral portion of the metal separator around the first outer joint line. In the structure, it is possible to suppress entry of corrosion causing ions inside the second outer joint line of the joint separator for the fuel cell. In this manner, since it is possible to suppress gap corrosion between the first outer joint line and the second outer joint line (in the outer peripheral portions of the metal separators) in the joint separator, it is possible to improve the durability of the joint separator. Further, since the first outer joint line has a function of receiving the reaction force which is produced when the bead seals of the joint separator are deformed, the allowable corrosion level of the first outer joint line is smaller than the allowable corrosion level of the second outer joint line. Stated otherwise, since the first outer joint line receives a large load in comparison with the second outer joint line, the first outer joint line tends to be corroded easily. However, since gap corrosion between the first outer joint line and the second outer joint line is suppressed in the joint separator, it is possible to suitably suppress corrosion of the first outer joint line which may otherwise be corroded easily. Therefore, it is possible to improve the durability of the joint separator significantly.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a joint separator for a fuel cell and a fuel cell stack of the present invention will be described with reference to the accompanying drawings.

Figure 1:
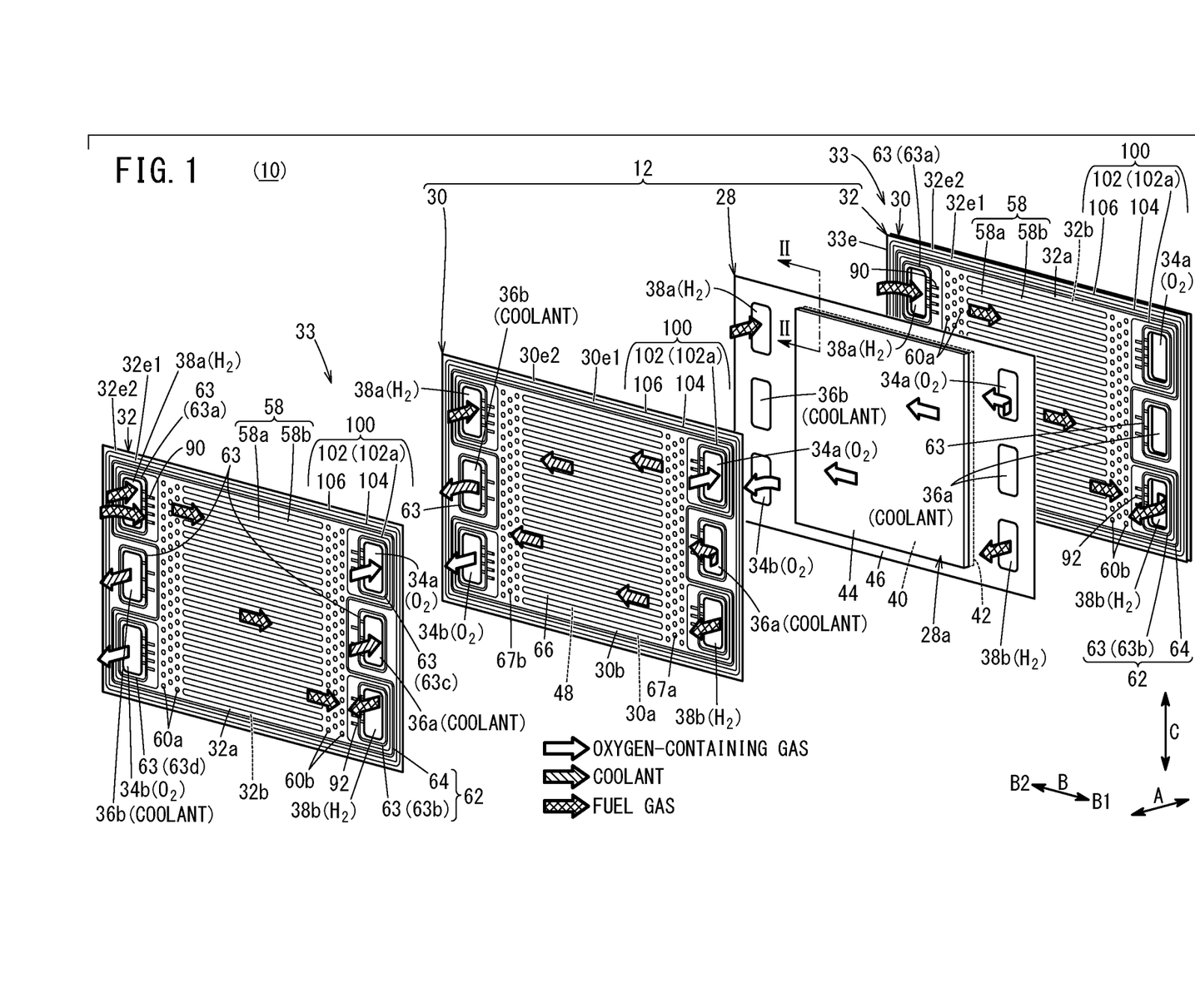
FIG. 1 is an exploded perspective view showing a power generation cell of a fuel cell stack according to an embodiment of the present invention.

A power generation cell 12 forming a unit of a fuel cell shown in FIG. 1 includes a resin film equipped MEA (membrane electrode assembly) 28, a first metal separator 30 provided on one side of the resin film equipped MEA 28, and a second metal separator 32 provided on the other surface of the resin film equipped MEA 28. A fuel cell stack 10 is formed by stacking a plurality of power generation cells 12, e.g., in a direction indicated by an arrow A (horizontal direction) or in a direction indicated by an arrow C (gravity direction), and applying a tightening load (compression load) in the stacking direction to the power generation cells 12. For example, the fuel cell stack 10 as an in-vehicle fuel cell stack is mounted in a fuel cell electric automobile (not shown).

Each of the first metal separator 30 and the second metal separator 32 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. The first metal separator 30 of one of the power generation cells 12 that are adjacent to each other and the second metal separator 32 of the other of the power generation cells 12 that are adjacent to each other are joined together to form a joint separator 33 for a fuel cell (hereinafter referred to as the "joint separator 33").

At one end of the power generation cell 12 in the longitudinal direction (horizontal direction) indicated by an arrow B (at one end in the direction indicated by an arrow B1), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the stacking direction (indicated by an arrow A). The oxygen-containing gas supply passage 34a, the coolant supply passage 36a, and the fuel gas discharge passage 38b are arranged in the vertical direction indicated by an arrow C. An oxygen-containing gas is supplied through the oxygen-containing gas supply passage 34a. A coolant such as water is supplied through the coolant supply passage 36a. A fuel gas such as a hydrogen-containing gas is discharged through the fuel gas discharge passage 38b.

At the other end of the power generation cell 12 in the longitudinal direction (the other end in the direction indicated by an arrow B2), a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout, shapes, and number of the oxygen-containing gas supply passage 34a, the oxygen-containing gas discharge passage 34b, the fuel gas supply passage 38a, and the fuel gas discharge passage 38b are not limited to the above embodiment, and may be changed as necessary depending on the required specification.

Figure 2:
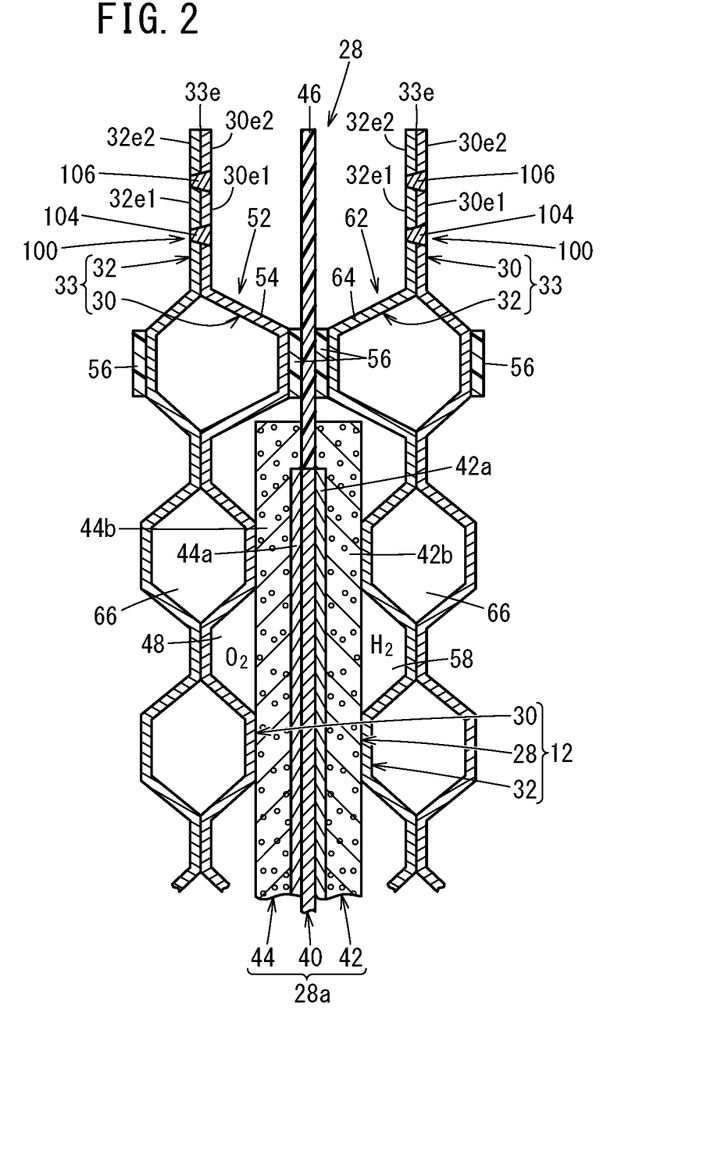
FIG. 2 is a cross sectional view showing main components of a power generation cell taken along a line II-II in FIG. 1.

As shown in FIG. 2, the resin film equipped MEA 28 includes a membrane electrode assembly 28a and a resin film 46 joined to the outer end of the membrane electrode assembly 28a, and provided around the outer end of the membrane electrode assembly 28a. The membrane electrode assembly 28a includes an electrolyte membrane 40, an anode 42 provided on one surface of the electrolyte membrane 40, and a cathode 44 provided on the other surface of the electrolyte membrane 40, for the electrolyte membrane 40 to be interposed therebetween.

For example, the electrolyte membrane 40 is a solid polymer electrolyte membrane (cation ion exchange membrane). The electrolyte membrane 40 is a thin membrane of perfluorosulfonic acid containing water, for example. The electrolyte membrane 40 is interposed between the anode 42 and the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a joined to one surface of the electrolyte membrane 40 and a first gas diffusion layer 44b stacked on the first electrode catalyst layer 44a. The anode 42 includes a second electrode catalyst layer 42a joined to the other surface of the electrolyte membrane 40 and a second gas diffusion layer 42b stacked on the second electrode catalyst layer 42a.

The inner end surface of the resin film 46 is positioned close to, overlapped with, or contacts the outer end surface of the electrolyte membrane 40. As shown in FIG. 1, at one end of the resin film 46 in the direction indicated by the arrow B1, the oxygen-containing gas supply passage 34a, the coolant supply passage 36a, and the fuel gas discharge passage 38b are provided. At the other end of the resin film 46 in the direction indicated by the arrow B2, the fuel gas supply passage 38a, the coolant discharge passage 36b, and the oxygen-containing gas discharge passage 34b are provided.

For example, the resin film 46 is made of PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. It should be noted that the electrolyte membrane 40 may be configured to protrude outward without using the resin film 46. Alternatively, a frame shaped film may be provided on both sides of the electrolyte membrane 40 which protrudes outward.

Figure 3:
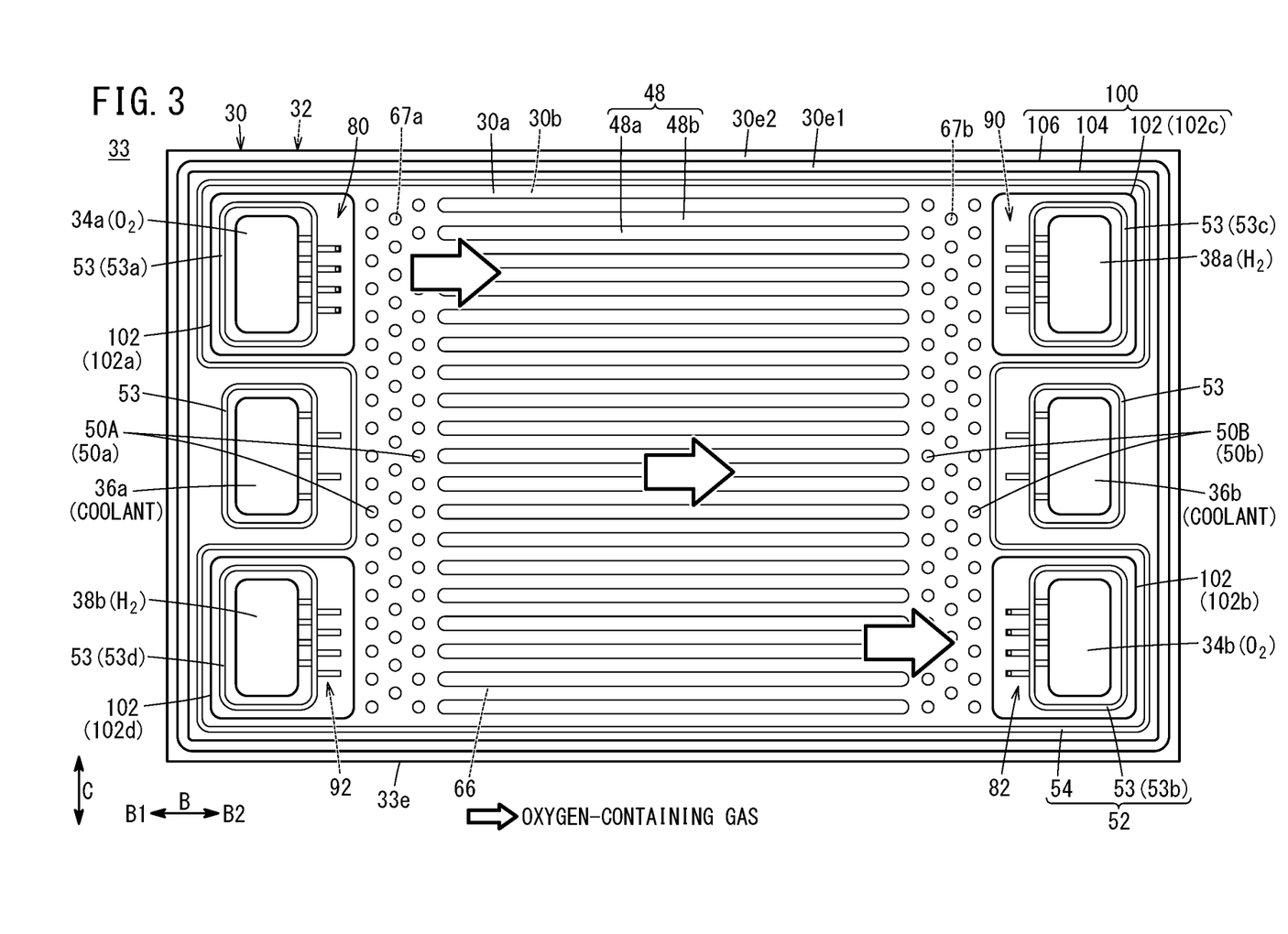
FIG. 3 is a plan view as viewed from an oxygen-containing gas flow field of a first metal separator.

As shown in FIG. 3, for example, an oxygen-containing gas flow field 48 is provided on a surface 30a of the first metal separator 30 facing the resin film equipped MEA 28 (hereinafter referred to as the "surface 30a"). The oxygen-containing gas flow field 48 extends in the direction indicated by the arrow B.

The oxygen-containing gas flow field 48 is connected to (in fluid communication with) the oxygen-containing gas supply passage 34a and the oxygen-containing gas discharge passage 34b. The oxygen-containing gas flow field 48 includes straight flow grooves 48b between a plurality of ridges 48a extending in the direction indicated by the arrow B. Instead of the plurality of straight flow grooves 48b, a plurality of wavy or serpentine flow grooves may be provided.

An inlet buffer 50A is provided on the surface 30a of the first metal separator 30, between the oxygen-containing gas supply passage 34a and the oxygen-containing gas flow field 48. The inlet buffer 50A includes a plurality of boss arrays each including a plurality of bosses 50a arranged in a direction indicated by an arrow C. Further, an outlet buffer 50B is provided on the surface 30a of the first metal separator 30, between the oxygen-containing gas discharge passage 34b and the oxygen-containing gas flow field 48. The outlet buffer 50B includes a plurality of boss arrays each including a plurality of bosses 50b.

On a surface 30b of the first metal separator 30 that is the other side of the oxygen-containing gas flow field 48, boss arrays each including a plurality of bosses 67a arranged in the direction indicated by the arrow C are provided between the boss arrays of the inlet buffer 50A, and boss arrays each including a plurality of bosses 67b arranged in the direction indicated by the arrow C are provided between the boss arrays of the outlet buffer 50B. The bosses 67a, 67b form a buffer on the coolant surface.

A first bead seal 52 for preventing leakage of the oxygen-containing gas to the outside (for prevention of fluid leakage) is formed on the surface 30a of the first metal separator 30 by press forming. The first bead seal 52 protrudes toward the resin film equipped MEA 28 (FIG. 1) (in the thickness direction of the first metal separator 30). As shown in FIG. 2, resin material 56 is fixed to protruding front surfaces of the first bead seal 52 by printing, coating, etc. For example, polyester fiber is used as the resin material 56. The resin material 56 may be provided on the part of the resin film 46. The resin material 56 is not essential. The resin material 56 may be dispensed with.

As shown in FIG. 3, the first bead seal 52 includes a plurality of passage beads 53 provided around a plurality of fluid passages (oxygen-containing gas supply passage 34a, etc.), respectively, and an outer bead 54 provided around the oxygen-containing gas flow field 48, the inlet buffer 50A, and the outlet buffer 50B.

The plurality of passage beads 53 protrude from the surface 30a of the first metal separator 30 toward the resin film equipped MEA 28. The passage beads 53 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

Hereinafter, among the plurality of passage beads 53, the passage bead formed around the oxygen-containing gas supply passage 34a will be referred to as the "passage bead 53a", and the passage bead formed around the oxygen-containing gas discharge passage 34b will be referred to as the "passage bead 53b". Further, among the plurality of passage beads 53, the passage bead formed around the fuel gas supply passage 38a will be referred to as the "passage bead 53c", and the passage bead formed around the fuel gas discharge passage 38b will be referred to as the "passage bead 53d".

The first metal separator 30 has bridge sections 80, 82 connecting the inside of the passage beads 53a, 53b (oxygen-containing gas supply passage 34a, oxygen-containing gas discharge passage 34b) and the outside (oxygen-containing gas flow field 48) of the passage beads 53a, 53b. The bridge section 80 is provided on a side part of the passage bead 53a formed around the oxygen-containing gas supply passage 34a, adjacent to the oxygen-containing gas flow field 48. The bridge section 82 is provided on a side part of the passage bead 53b formed around the oxygen-containing gas discharge passage 34b, adjacent to the oxygen-containing gas flow field 48.

As shown in FIG. 1, for example, the second metal separator 32 has a fuel gas flow field 58 on its surface 32a facing the resin film equipped MEA 28 (hereinafter referred to as the "surface 32a"). The fuel gas flow field 58 extends in the direction indicated by the arrow B.

Figure 4:
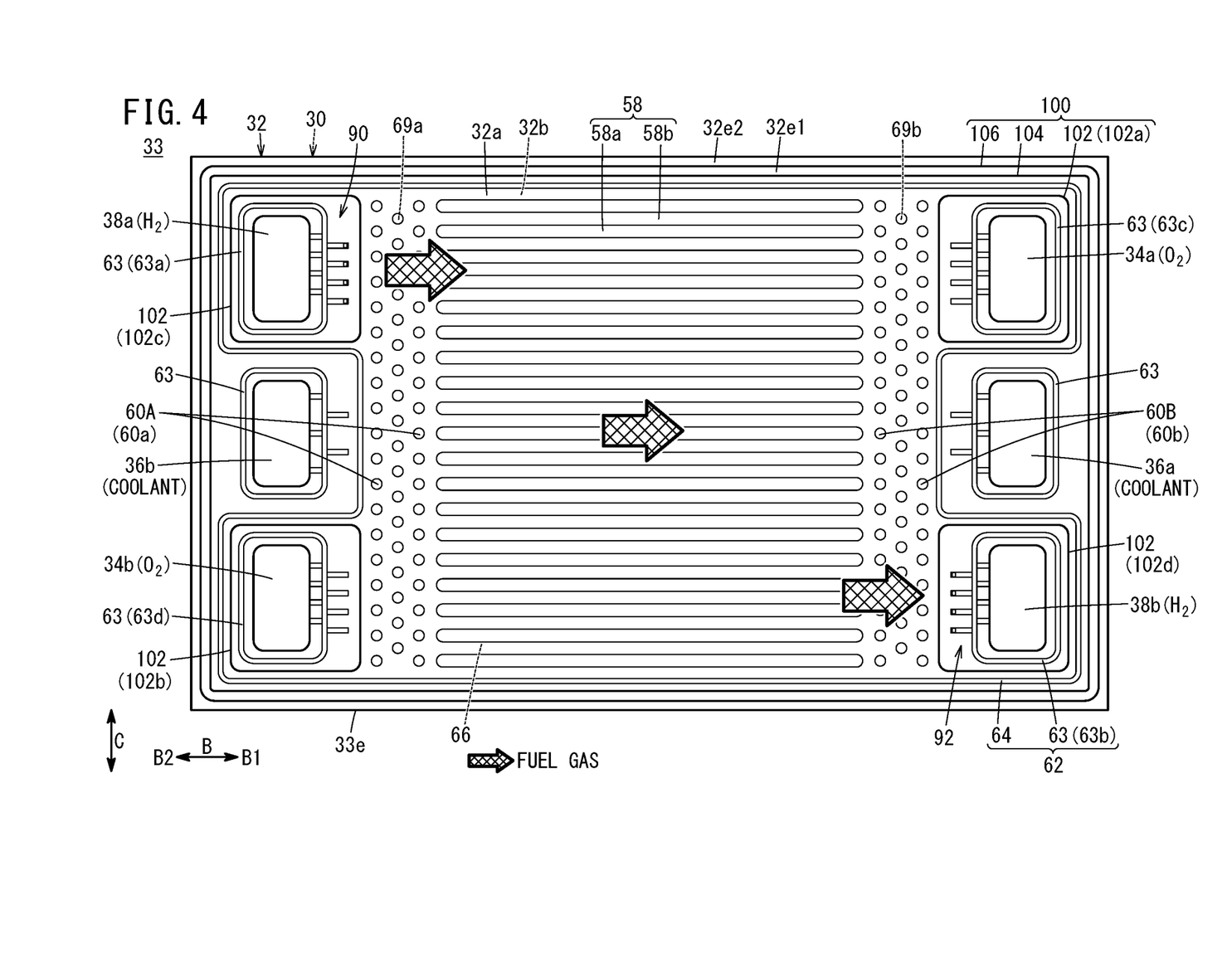
FIG. 4 is a plan view as viewed from a fuel gas flow field of a second metal separator.

As shown in FIG. 4, the fuel gas flow field 58 is connected to (in fluid communication with) the fuel gas supply passage 38a and the fuel gas discharge passage 38b. The fuel gas flow field 58 includes straight flow grooves 58b between a plurality of ridges 58a extending in the direction indicated by the arrow B. Instead of the straight flow grooves 58b, wavy or serpentine flow grooves may be provided.

An inlet buffer 60A is provided on the surface 32a of the second metal separator 32, between the fuel gas supply passage 38a and the fuel gas flow field 58. The inlet buffer 60A includes a plurality of boss arrays each including a plurality of bosses 60a extending in the direction indicated by the arrow C. Further, an outlet buffer 60B including a plurality of boss arrays is provided on the surface 32a of the second metal separator 32, between the fuel gas discharge passage 38b and the fuel gas flow field 58. Each of the boss arrays includes a plurality of bosses 60b.

On a surface 32b of the second metal separator 32 that is the other side of the fuel gas flow field 58, boss arrays each including a plurality of bosses 69a arranged in the direction indicated by the arrow C are provided between boss arrays of the inlet buffer 60A, and boss arrays each including a plurality of bosses 69b arranged in the direction indicated by the arrow C are provided between the boss arrays of the outlet buffer 60B. The bosses 69a, 69b form a buffer on the coolant surface.

A second bead seal 62 is formed on the surface 32a of the second metal separator 32 by press forming, for preventing leakage of the fuel gas to the outside (for prevention of fluid leakage). The second bead seal 62 protrudes toward the resin film equipped MEA 28 (FIG. 1) (in the thickness direction of the second metal separator 32). As shown in FIG. 2, resin material 56 is fixed to protruding front surfaces of the second bead seal 62 by printing, coating, etc. For example, polyester fiber is used as the resin material 56. The resin material 56 may be provided on the part of the resin film 46. The resin material 56 is not essential. The resin material 56 may be dispensed with.

As shown in FIG. 4, the second bead seal 62 includes a plurality of passage beads 63 provided around the plurality of fluid passages (fuel gas supply passage 38a, etc.), respectively, and an outer bead 64 provided around the fuel gas flow field 58, the inlet buffer 60A and the outlet buffer 60B.

The plurality of passage beads 63 protrude from the surface 32a of the second metal separator 32, and are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

Hereinafter, among the plurality of passage beads 63, the passage bead formed around the fuel gas supply passage 38a will be referred to as the "passage bead 63a", and the passage bead formed around the fuel gas discharge passage 38b will be referred to as the "passage bead 63b". Further, among the plurality of passage beads 63, the passage bead formed around the oxygen-containing gas supply passage 34a will be referred to as the "passage bead 63c", and the passage bead formed around the oxygen-containing gas discharge passage 34b will be referred to as the "passage bead 63d".

The second metal separator 32 has bridge sections 90, 92 connecting the inside (fuel gas supply passage 38a, fuel gas discharge passage 38b) of the passage beads 63a, 63b around the fuel gas supply passage 38a and the fuel gas discharge passage 38b and the outside (fuel gas flow field 58) of the passage beads 63a, 63b. The bridge section 90 is provided on a side part of the passage bead 63a formed around the fuel gas supply passage 38a, adjacent to the fuel gas flow field 58. The bridge section 92 is provided on a side part of the passage bead 63b formed around the fuel gas discharge passage 38b, adjacent to the fuel gas flow field 58. Bridges in the bridge section 92 are provided at intervals.

As shown in FIG. 1, a coolant flow field 66 is formed between the surface 30b of the first metal separator 30 and the surface 32b of the second metal separator 32 that are joined together. The coolant flow field 66 is connected to (in fluid communication with) the coolant supply passage 36a and the coolant discharge passage 36b. The coolant flow field 66 is formed by stacking a back surface of the first metal separator 30 (the back side of the oxygen-containing gas flow field 48) and a back surface of the second metal separator 32 (the back side of the fuel gas flow field 58) together.

As shown in FIGS. 3 and 4, the first metal separator 30 and the second metal separator 32 of the joint separator 33 are joined together by a joint line 100. The joint line 100 is a laser welding bead formed by laser welding. It should be noted that the joint line 100 is not limited to laser welding bead. The joint line 100 may be a welding bead formed by welding other than laser welding (e.g., TIG welding, MIG welding, seam welding, etc.), or a joint section formed by friction stir welding, brazing, etc.

The joint line 100 includes a passage joint line 102, a first outer joint line 104, and a second outer joint line 106. The passage joint line 102 includes four passage joint lines 102a to 102d.

The passage joint line 102a surrounds the oxygen-containing gas supply passage 34a, the passage bead 53a, the passage bead 63c, and the bridge section 80 entirely (as a whole). The passage joint line 102b surrounds the oxygen-containing gas discharge passage 34b, the passage bead 53b, the passage bead 63d, and the bridge section 82 entirely (as a whole).

The passage joint line 102c surrounds the fuel gas supply passage 38a, the passage bead 53c, the passage bead 63a, and the bridge section 90 entirely. The passage joint line 102d surrounds the fuel gas discharge passage 38b, the passage bead 53d, the passage bead 63b, and the bridge section 92 entirely.

As shown in FIGS. 2 to 4, the first outer joint line 104 is provided in the outer peripheral portion of the joint separator 33, and surrounds the oxygen-containing gas flow field 48, the fuel gas flow field 58, the coolant flow field 66, the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b entirely (as a whole). Stated otherwise, the first outer joint line 104 surrounds the passage beads 53, 63 and the outer beads 54, 64 entirely (as a whole). It should be noted that, preferably, the first outer joint line 104 is provided outside, and adjacent to the outer beads 54, 64. In this case, the first outer joint line 104 can effectively receive the reaction force when the outer beads 54, 64 are deformed.

The second outer joint line 106 is provided in the outer peripheral portions of the first metal separator 30 and the second metal separator 32, outside the first outer joint line 104. The second outer joint line 106 is provided along an outer marginal portion 33e of the joint separator 33 (outer shape of the first metal separator 30 and the second metal separator 32).

That is, at the outer peripheral portion of the joint separator 33, dual joint lines, i.e., the first outer joint line 104 and the second outer joint line 106 are provided. The first outer joint line 104 and the second outer joint line 106 are provided side by side, along the outer marginal portion 33e of the joint separator 33.

As shown in FIG. 2, a first outer portion 30e1 positioned between the first outer joint line 104 and the second outer joint line 106 in the first metal separator 30 is in contact with a second outer portion 32e1 positioned between the first outer joint line 104 and the second outer joint line 106 in the second metal separator 32. Stated otherwise, the first outer portion 30e1 and the second outer portion 32e1 are in contact with each other over the entire periphery (over substantially the entire surface). That is, in effect, no gap is formed between the first outer portion 30e1 and the second outer portion 32e1.

The contact surfaces of the first metal separator 30 and the second metal separator 32 between the first outer joint line 104 and the second outer joint line 106 are flat surfaces. Stated otherwise, the surface of the first outer portion 30e1 facing the second outer portion 32e1 is a flat surface. The surface of the second outer portion 32e1 facing the first outer portion 30e1 is a flat surface.

A first outermost portion 30e2 positioned outside the second outer joint line 106 in the first metal separator 30 is in contact with a second outermost portion 32e2 positioned outside the second outer joint line 106 in the second metal separator 32. Stated otherwise, the first outermost portion 30e2 and the second outermost portion 32e2 are in contact with each other over the entire periphery (over substantially the entire surface). That is, in effect, no gap is formed between the first outermost portion 30e2 and the second outermost portion 32e2.

The contact surfaces of the first metal separator 30 and the second metal separator 32 outside the second outer joint line 106 are flat surfaces. Stated otherwise, the surface of the first outermost portion 30e2 facing the second outermost portion 32e2 is a flat surface. The surface of the second outermost portion 32e2 facing the first outermost portion 30e2 is a flat surface.

Operation of the power generation cell 12 having the above structure will be described below.

First, as shown in FIG. 1, an oxygen-containing gas such as air is supplied to the oxygen-containing gas supply passage 34a. A fuel gas such as a hydrogen-containing gas is supplied to the fuel gas supply passage 38a. Coolant such as pure water, ethylene glycol, oil is supplied to the coolant supply passage 36a.

The oxygen-containing gas is supplied from the oxygen-containing gas supply passage 34a into the oxygen-containing gas flow field 48 of the first metal separator 30 through the bridge section 80 (FIG. 3). Then, the oxygen-containing gas flows along the oxygen-containing gas flow field 48 in the direction indicated by the arrow B, and the oxygen-containing gas is supplied to the cathode 44 of the membrane electrode assembly 28a.

In the meanwhile, the fuel gas supplied from the fuel gas supply passage 38a into the fuel gas flow field 58 of the second metal separator 32 through the bridge section 90. The fuel gas flows along the fuel gas flow field 58 in the direction indicated by the arrow B, and the fuel gas is supplied to the anode 42 of the membrane electrode assembly 28a.

Thus, in each of the membrane electrode assembly 28a, the oxygen-containing gas supplied to the cathode 44 and the fuel gas supplied to the anode 42 are partially consumed in electrode chemical reactions in the first electrode catalyst layer 44a and the second electrode catalyst layer 42a to generate electricity.

Then, the oxygen-containing gas supplied to, and partially consumed at the cathode 44 flows from oxygen-containing gas flow field 48 to the oxygen-containing gas discharge passage 34b through the bridge section 82, and the oxygen-containing gas is discharged along the oxygen-containing gas discharge passage 34b in the direction indicated by the arrow A. Likewise, the fuel gas supplied to, and partially consumed at the anode 42 flows from the fuel gas flow field 58 to the fuel gas discharge passage 38b through the bridge section 92, and the fuel gas is discharged along the fuel gas discharge passage 38b in the direction indicated by the arrow A.

Further, the coolant supplied to the coolant supply passage 36a flows into the coolant flow field 66 formed between the first metal separator 30 and the second metal separator 32. Thereafter, the coolant flows in the direction indicated by the arrow B. After the coolant cools the membrane electrode assembly 28a, the coolant is discharged from the coolant discharge passage 36b.

In this case, the power generation cell 12 according to the embodiment of the present invention offers the following advantages.

The joint separator 33 is formed by stacking the first metal separator 30 and the second metal separator 32 together such that the coolant flow field 66 is formed between the first metal separator 30 and the second metal separator 32, and joining the first metal separator 30 and the second metal separator 32 together by the joint line 100.

The joint line 100 includes the passage joint line 102, the first outer joint line 104, and the second outer joint line 106. The passage joint line 102 is provided around the reactant gas passages (the oxygen-containing gas supply passage 34a, the oxygen-containing gas discharge passage 34b, the fuel gas supply passage 38a, and the fuel gas discharge passage 38b).

The first outer joint line 104 is provided in the outer peripheral portion of the joint separator 33 (the first metal separator 30 and the second metal separator 32), and surrounds the coolant flow field 66 and the reactant gas passages entirely. The second outer joint line 106 is provided in the outer peripheral portion the joint separator 33 (the first metal separator 30 and the second metal separator 32), around the first outer joint line 104.

In the structure, it is possible to suppress entry of corrosion causing ions inside the second outer joint line 106 of the joint separator 33 (between the first outer portion 30e1 and the second outer portion 32e1). In this manner, since it is possible to suppress gap corrosion between the first outer joint line 104 and the second outer joint line 106 (in at least one of the first outer portion 30e1 and the second outer portion 32e1) in the joint separator 33, it is possible to improve the durability of the joint separator 33.

Further, since the first outer joint line 104 has a function of receiving the reaction force which is produced when the bead seals (outer beads 54, 64) of the joint separator 33 are deformed, the allowable corrosion level of the first outer joint line 104 is smaller than the allowable corrosion level of the second outer joint line 106. Stated otherwise, since the first outer joint line 104 receives a large load in comparison with the second outer joint line 106, the first outer joint line 104 tends to be corroded easily. However, since gap corrosion between the first outer joint line 104 and the second outer joint line 106 in the joint separator 33 is suppressed, it is possible to suitably suppress corrosion of the first outer joint line 104 which may otherwise be corroded easily. Therefore, it is possible to improve the durability of the joint separator 33 significantly.

The first metal separator 30 and the second metal separator 32 are in contact with each other between the first outer joint line 104 and the second outer joint line 106. Stated otherwise, the first outer portion 30e1 and the second outer portion 32e1 are in contact with each other. Therefore, it is possible to suppress entry of corrosion causing ions between the first outer portion 30e1 and the second outer portion 32e1.

The contact surfaces of the first metal separator 30 and the second metal separator 32 between the first outer joint line 104 and the second outer joint line 106 are flat surfaces. Therefore, with the simple structure, it is possible to bring the first outer portion 30e1 and the second outer portion 32e1 into contact with each other efficiently.

The second outer joint line 106 is provided along the outer shapes of the first metal separator 30 and the second metal separator 32. In the structure, it is possible to suppress flow of corrosion causing ions between the first metal separator 30 and the second metal separator 32 effectively to a greater extent.

Since the joint line 100 is a laser welding bead, it is possible to reliably joint the first metal separator 30 and the second metal separator 32 efficiently and reliably.

The first metal separator 30 and the second metal separator 32 are in contact with each other outside the second outer joint line 106. Stated otherwise, the first outermost portion 30e2 and the second outermost portion 32e2 are in contact with each other. Thus, it is possible to suppress entry of corrosion causing ions to the outside of the second outer joint line 106 ion the joint separator 33 (between the first outermost portion 30e2 and the second outermost portion 32e2).

Thus, since it is possible to suppress occurrence of gap corrosion outside the second outer joint line 106 in the joint separator 33 (at lease one of the first outermost portion 30e2 and the second outermost portion 32e2), it is possible to improve the durability of the joint separator 33 to a greater extent.

The contact surfaces of the first metal separator 30 and the second metal separator 32 outside the second outer joint line 106 (the first outermost portion 30e2 and the second outermost portion 32e2) are flat surfaces. Therefore, with the simple structure, it is possible to bring the first outermost portion 30e2 and the second outermost portion 32e2 into contact with each other efficiently.

The bead seal (outer bead 54) is formed in the first metal separator 30, around the coolant flow field 66 and the reactant gas passages (the oxygen-containing gas supply passage 34a, the oxygen-containing gas discharge passage 34b, the fuel gas supply passage 38a, and the fuel gas discharge passage 38b), for prevention of fluid leakage. The bead seal protrudes from the surface 30a of the first metal separator 30.

The bead seal (outer bead 64) is formed in the second metal separator 32, around the coolant flow field 66 and the reactant gas passages (the oxygen-containing gas supply passage 34a, the oxygen-containing gas discharge passage 34b, the fuel gas supply passage 38a, and the fuel gas discharge passage 38b), for prevention of fluid leakage. The bead seal protrudes from the surface 32a of the second metal separator 32.

The first outer joint line 104 is provided outside and adjacent to the bead seals (outer beads 54, 64). Thus, reaction force produced when the outer beads 54, 64 are deformed can be received effectively by the first outer joint line 104.

In the joint separator 33, one joint line or a plurality of joint line may be provided outside the second outer joint line 106, around the second outer joint line 106. The distance between the first outer joint line 104 and the second outer joint line 106 is not necessarily the same over the entire periphery, and may be increased or decreased depending on the position in the peripheral direction.

The joint separator for a fuel cell and the fuel cell stack according to the present invention are not limited to the above described embodiment. Various structures may be adopted without deviating from the gist of the present invention.

What is claimed is:

1. A joint separator for a fuel cell, including two metal separators stacked together and joined by a joint line, the metal separators each including a reactant gas flow field for allowing a reactant gas to flow along an electrode surface, a reactant gas passage connected to the reactant gas flow field and a passage bead surrounding the reactant gas passage, the passage bead protruding from a surface of the metal separator and being configured to prevent fluid leakage, a coolant flow field being formed between the metal separators stacked together for allowing a coolant to flow between the metal separators,
wherein the joint line comprises:
passage joint lines respectively provided around outer peripheries of the passage beads surrounding the reactant gas passages;
a first outer joint line provided in outer peripheral portions of the metal separators, and surrounding the reactant gas flow field, the coolant flow field, and the reactant gas passage entirely;
a second outer joint line provided in the outer peripheral portions of the metal separators, around the first outer joint line,
the second outer joint line being configured to suppress entry of corrosion causing ions between the first outer joint line and the second outer joint line,
each of the two metal separators includes an outer bead configured to prevent fluid leakage, around the coolant flow field and the reactant gas passage, and protruding from the surface of the metal separator,
the passage bead of each metal separator is provided inside of the outer bead, and
the first outer joint line is provided outside and adjacent to the outer beads.

2. The joint separator for the fuel cell according to claim 1, wherein the two metal separators are in contact with each other between the first outer joint line and the second outer joint line.

3. The joint separator for the fuel cell according to claim 2, wherein contact surfaces of the two metal separators between the first outer joint line and the second outer joint line are flat surfaces.

4. The joint separator for the fuel cell according to claim 1, wherein the second outer joint line is provided along the outer shapes of the metal separators.

5. The joint separator for the fuel cell according to claim 1, wherein the joint line is laser welding bead.

6. The joint separator for the fuel cell according to claim 1, wherein the two metal separators are in contact with each other outside the second outer joint line.

7. The joint separator for the fuel cell according to claim 6, wherein the contact surfaces of the two metal separators outside the second outer joint line are flat surfaces.

8. A fuel cell stack including stacked power generation cells, the power generation cells each including a membrane electrode assembly and metal separators provided on both sides of the membrane electrode assembly, the membrane electrode assembly including an electrolyte membrane and electrodes provided on both sides of the electrolyte membrane,
wherein two of the metal separators that are adjacent to each other are joined together to form a joint separator for a fuel cell,
wherein the joint separator includes the two metal separators stacked together and joined by a joint line, the metal separators each including a reactant gas flow field for allowing a reactant gas to flow along an electrode surface, a reactant gas passage connected to the reactant gas flow field and a passage bead surrounding the reactant gas passage, the passage bead protruding from a surface of the metal separator and being configured to prevent fluid leakage, a coolant flow field being formed between the metal separators stacked together for allowing a coolant to flow between the metal separators, and
wherein the joint line comprises:
passage joint lines respectively provided around outer peripheries of the passage beads surrounding the reactant gas passages;
a first outer joint line provided in outer peripheral portions of the metal separators, and surrounding the reactant gas flow field, the coolant flow field, and the reactant gas passage entirely; and
a second outer joint line provided in the outer peripheral portions of the metal separators, around the first outer joint line,
the second outer joint line being configured to suppress entry of corrosion causing ions between the first outer joint line and the second outer joint line,
each of the two metal separators includes an outer bead configured to prevent fluid leakage, around the coolant flow field and the reactant gas passage, and protruding from the surface of the metal separator,
the passage bead of each metal separator is provided inside of the outer bead, and
the first outer joint line is provided outside and adjacent to the outer beads.

9. The fuel cell stack according to claim 8, wherein the joint line is laser welding bead.

* * * * *